United States Patent
Wakisaka et al.

(10) Patent No.: US 7,048,341 B2
(45) Date of Patent: May 23, 2006

(54) BEARING DEVICE FOR AN AXLE

(75) Inventors: Teruyuki Wakisaka, Nara (JP);
Shigetaka Ashida, Nara (JP);
Shinichirou Kashiwagi, Yao (JP);
Shinnosuke Takasaki, Kashiwara (JP)

(73) Assignee: Koyo Seiko Co., Ltd, Osaka (JP)

( * ) Notice: Subject to any disclaimer, the term of this patent is extended or adjusted under 35 U.S.C. 154(b) by 0 days.

(21) Appl. No.: 10/359,373

(22) Filed: Feb. 6, 2003

(65) Prior Publication Data
US 2005/0073190 A1   Apr. 7, 2005

(51) Int. Cl.
*B60B 27/00* (2006.01)

(52) U.S. Cl. .................... 301/105.1; 301/6.8; 384/544

(58) Field of Classification Search ............. 301/105.1, 301/124.1, 131, 137, 6.8; 384/544, 589, 384/585, 476; 29/217, 426.5, 898.09; 180/252, 180/258
See application file for complete search history.

(56) References Cited

U.S. PATENT DOCUMENTS

| | | | | |
|---|---|---|---|---|
| 4,371,214 A | * | 2/1983 | Strader | 301/126 |
| 4,668,111 A | * | 5/1987 | Kapaan | 384/544 |
| 5,263,900 A | * | 11/1993 | Stimson | 188/181 R |
| 5,549,514 A | * | 8/1996 | Welschof | 464/145 |
| 5,899,305 A | * | 5/1999 | Austin et al. | 188/218 XL |
| 6,247,219 B1 | * | 6/2001 | Austin et al. | 29/434 |
| 6,708,589 B1 | * | 3/2004 | Brinker et al. | 82/1.11 |
| 6,880,898 B1 | * | 4/2005 | Nakamura et al. | 301/105.1 |

* cited by examiner

*Primary Examiner*—Frantz F. Jules
(74) *Attorney, Agent, or Firm*—Jordan and Hamburg LLP

(57) ABSTRACT

A bearing device for an axle: including a hub wheel; a flange outwardly provided in an outer periphery of the hub wheel in a radial direction; and bolts having serrations provided at their heads. The flange includes through holes formed therein in its circumferential direction such as to pass therethrough in its axial direction, the bolts are attached into the through holes, respectively, in a state where their serrations bite the through holes of the flange, and an annular groove for reducing a biting amount of the serrations of the bolt is formed in an inner peripheral surface of the through hole of the flange.

20 Claims, 9 Drawing Sheets

F I G . 11
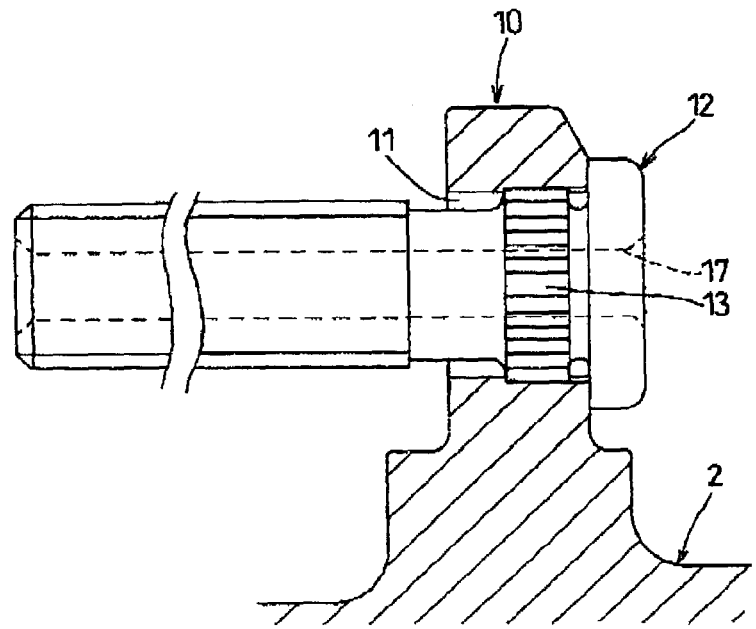
F I G . 12
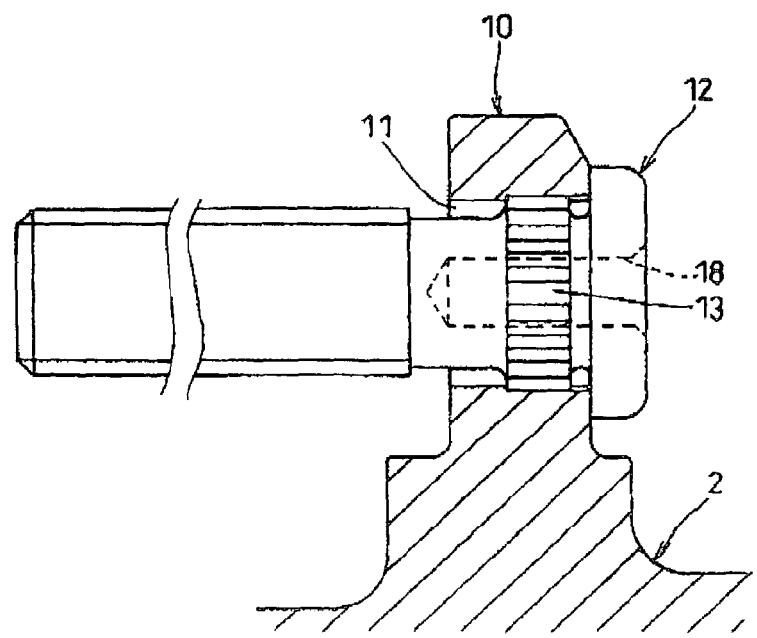

F I G. 13
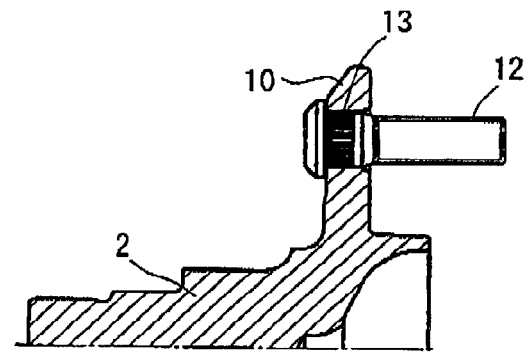
F I G. 14
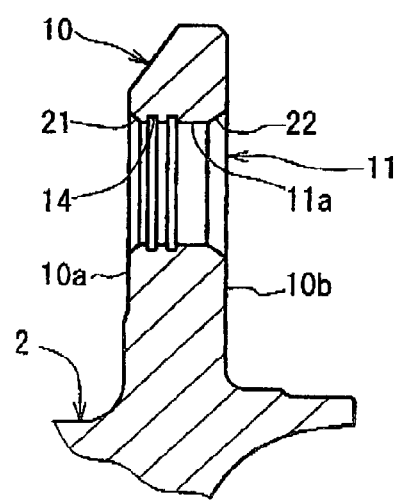
F I G. 15
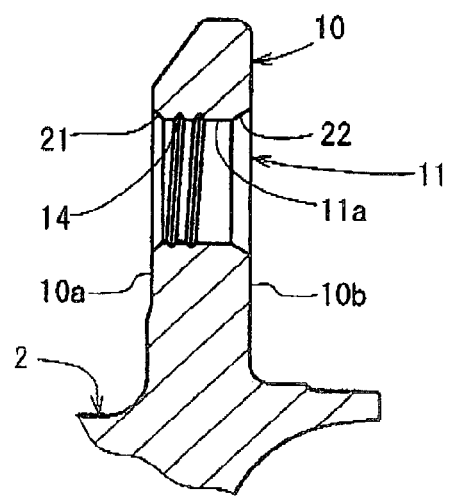

BEARING DEVICE FOR AN AXLE

BACKGROUND OF THE INVENTION

With reference to FIG. 16, a disk rotor 5 is fixed to an outer end surface of a flange 10 of a hub wheel 2 by means of a plurality of bolts 12 which are inserted into through holes 11 formed in a circumference of the flange 10. The disk rotor 5 is fixed to the flange 10 after a bearing device for axle 1 is attached to a drive shaft 4. Therefore, it is necessary to previously attach the bolts 12 into the through holes 11 of the flange 10. The bolts 12 are attached into the through holes 11 in non-separable manner so that the bolts 12 do not come out the flange 10 when the bearing device for axle 1 is independently handled. For this reason, the bolt 12 is formed with a serration 13. The bolt 12 is fitted into the through hole 11 in such a state where the serration 13 bites into a circular inner peripheral surface of the through hole 11.

In this state, a diameter of the through hole 11 is finely increased by its plastic deformation, and an outer end surface of the flange 10 is finely undulated in its circumferential direction and radial direction. As a result, a surface precision of the outer end surface of the flange 10 is lowered. More specifically, an inner diameter of the through hole 11 is expanded by μm unit in the serration 13 of the bolt 12 as shown with arrows in FIG. 17, and the surface precision is lowered. The deterioration of the surface precision in the outer end surface of the flange 10 causes the deterioration of adhesion of the disk rotor 5 with respect to the flange 10, whereby the disk rotor 5 is inclined and its rotation precision is disadvantageously deteriorated.

Therefore, it is an object of the present invention to provide a bearing device for axle capable of stabilizing the attachment position of the disk rotor with respect to the hub wheel.

SUMMARY OF THE INVENTION

The present invention provides a bearing device for axle comprising: a hub wheel; a flange outwardly provided in an outer periphery of the hub wheel in a radial direction; and bolts having serrations provided at their heads, wherein the flange includes a plurality of through holes formed therein in its circumferential direction such as to pass therethrough in its axial direction, the bolts are attached into the through holes, respectively, in a state where their serrations bite the through holes of the flange, and an annular groove for reducing a biting amount of the serration of the bolt is formed in an inner peripheral surface of the through hole of the flange.

Depending upon embodiments of the annular groove of the present invention, one annular groove is provided in at least a biting region of the serration in the inner peripheral surface of the through hole, or several annular grooves are independently provided at several locations in the axial direction, or the annular groove is helically continuously formed. In this case, when the bolt is attached into the through hole, the biting amount of the serration of the bolt with respect to the inner peripheral surface of the through hole can be reduced as small as possible and, thus, the flow of the wall portion by the plastic deformation can be suppressed.

In one of the embodiments of the present invention, the bolt is attached in a state where the disk rotor of the disk brake apparatus abuts against the outer end surface of the flange directed radially outwardly of the hub wheel, several through holes are provided around the circumference of the flange, the wheel-mounting bolts are fitted into the through holes in a state where the bolts pass through the through hole and serrations provided on the side of the heads of the bolts bite the through holes, and a weak portion is provided around the through hole for permitting a phenomenon in which the through hole is increased in diameter by the plastic deformation when the bolt is mounted into the through hole.

The weak portion may has an annular recess which is formed by recessing an outer peripheral portion of the through hole in the flange from an outer side or an inner side of a vehicle concentrically with the through hole, or the weak portion may comprise annular recesses which are formed by recessing an outer diameter side and an inner diameter side of the through hole in the flange from an outer side or an inner side of a vehicle concentrically with the flange.

In this case, when the bolt is attached into the through hole, although the flow of the wall portion of the through hole is generated by the plastic deformation by the weak portion around the through hole when the bolt is mounted into the through hole, since the flow of the wall portion is generated in a state where it is absorbed by the weak portion and the flow is less prone to be transferred to the outer end surface of the flange, the outer end surface of the flange becomes less prone to be deformed.

The above and other embodiments will be apparent from the following description of the present invention in association with the accompanying drawings.

BRIEF DESCRIPTION OF THE DRAWINGS

FIG. 11 is an enlarged view showing a main portion of a hub wheel in a bearing device for axle according to yet another embodiment of the present invention;

FIG. 12 is an enlarged view showing a main portion of a hub wheel in a bearing device for axle according to yet another embodiment of the present invention;

FIG. 13 is an enlarged view showing a main portion of a hub wheel in a bearing device for axle according to yet another embodiment of the present invention;

FIG. 14 is an enlarged view showing a main portion of a flange of a hub wheel in a bearing device for axle according to yet another embodiment of the present invention;

FIG. 15 is an enlarged view showing a main portion of a flange of a hub wheel in a bearing device for axle according to yet another embodiment of the present invention;

In these figures, the same elements are designated with the same symbols.

DETAILED DESCRIPTION OF THE INVENTION

Figure 1:
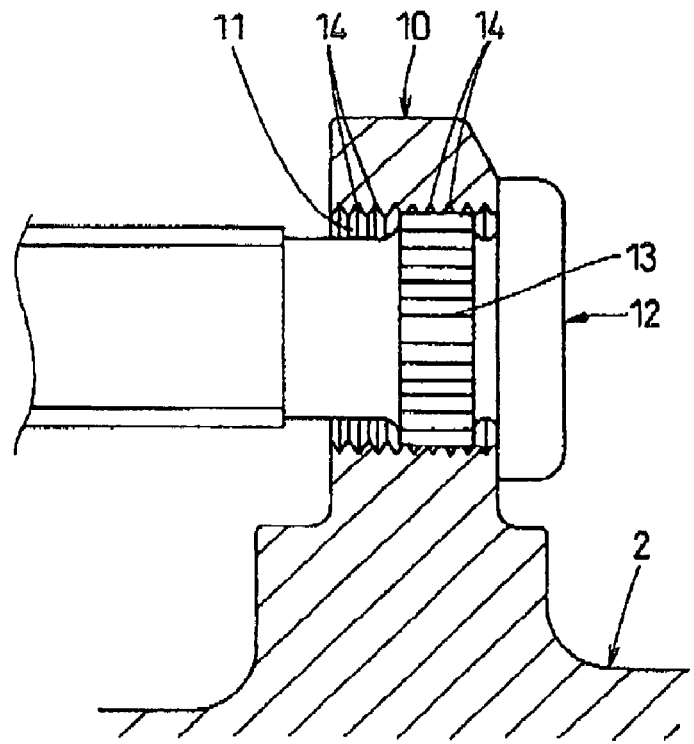
FIG. 1 is an enlarged view showing a main portion of a hub wheel in a bearing device for axle according to an embodiment of the present invention.
Figure 2:
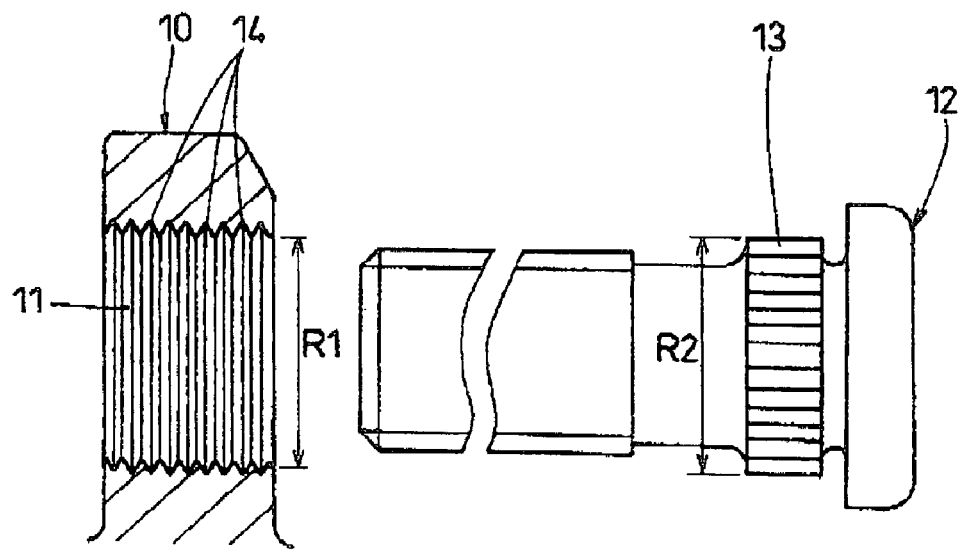
FIG. 2 shows a state before a bolt is attached in FIG. 1.
Figure 16:
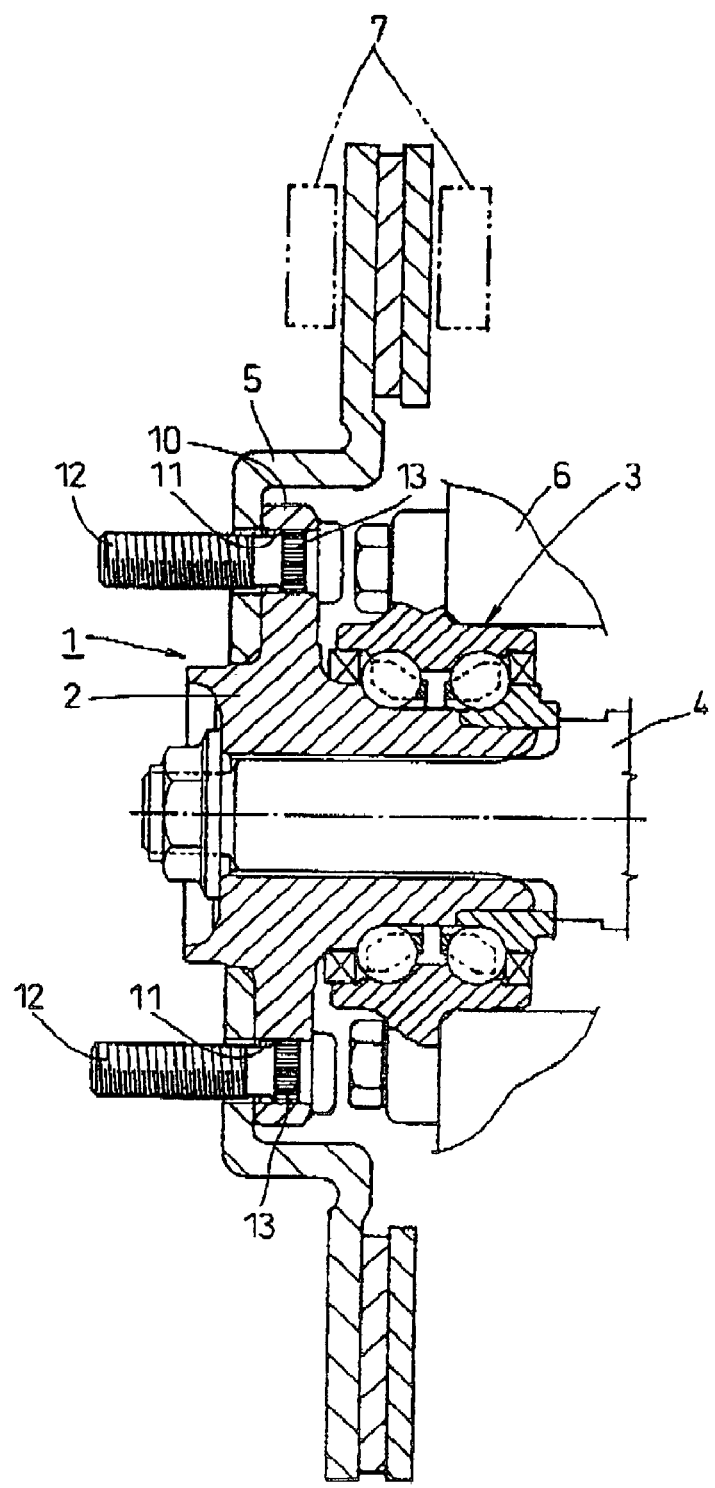
FIG. 16 is a vertical sectional view showing a conventional bearing device for axle for a driving wheel.
Figure 17:
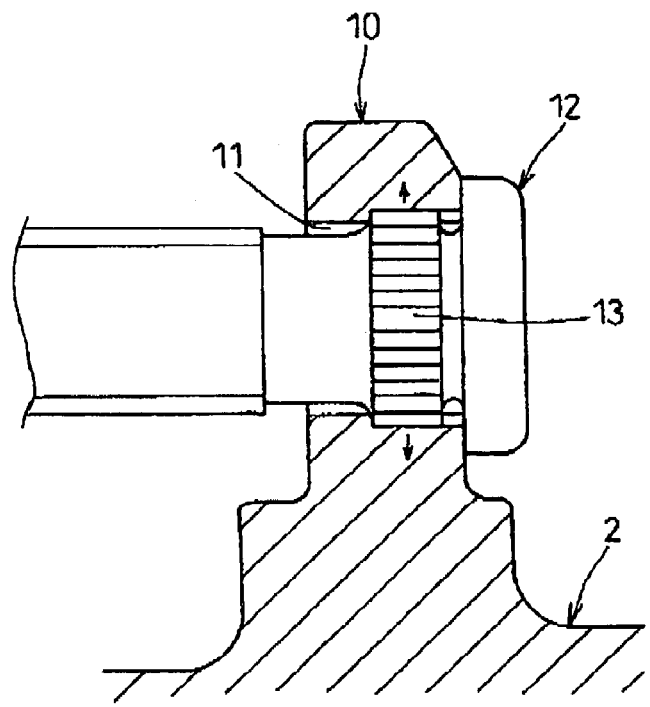
FIG. 17 is an explanatory view for pointing out a conventional problem.

With reference to the drawings, FIG. 1 is an enlarged view showing a main portion of a hub wheel in a bearing device for axle according to an embodiment of the present invention, and FIG. 2 shows a state before a bolt is attached in FIG. 1. Since the entire structure of the bearing device for axle is shown in FIG. 16, description thereof will not be repeated. In FIG. 16, a reference numeral 1 represents the bearing device for axle of this embodiment, a reference numeral 2 represents a hub wheel, a reference numeral 3 represents a double row angular ball bearing with vertex of contact angles outside of bearing as a rolling bearing, a reference numeral 4 represents a drive shaft, a reference numeral 6 represents a knuckle as a part of a body, a reference numeral 7 represents a brake pad, a reference numeral 10 represents a flange, a reference numeral 11 represents a through hole, a reference numeral 12 represents a bolt, and a reference numeral 13 represents a serration.

In order to suppress the outer end surface of the flange 10 from being undulated when the bolt 12 is attached into the through hole 11 of the flange 10 of the hub wheel 2, this bearing device 1 has the following idea.

That is, as shown in the figure, an inner peripheral surface of the through hole 11 of the flange 10 is formed with a plurality of annular grooves 14 adjacently in an axial direction of the through hole 11. The annular grooves 14 need not be formed over the entire length of the through hole 11, and may be formed in a region where at least the serration 13 of the bolt 12 bites into the through hole 11. The number of annular grooves 14 is optionally determined.

As shown in FIG. 2, a biting margin of the through hole 11 bitten by the serration 13 of the bolt 12 is managed by setting an inner diameter R1 of a minimum diameter portion of the annular groove 14 of the through hole 11 smaller than an outer diameter R2 of the serration 13 of the bolt 12. The biting margin is preferably 0.5 mm or less and more preferably 0.3 mm or less. With this arrangement, the bolt 12 is held such that the bolt 12 does not come out from the through hole 11 and is prevented from rotating.

In the above-described embodiment, it is possible to reduce the biting amount of the serration 13 of the bolt 12 with respect to the inner peripheral surface of the through hole 11 when the bolt 12 is attached into the through hole 11. Therefore, it is possible to reduce the flow of a wall portion around the through hole 11 by the plastic deformation. With this arrangement, it is possible to prevent the flow of the wall portion around the through hole 11 from affecting the outer end surface of the flange 10 and, thus, this advantageously keeps the outer end surface of the flange 10 smooth.

Therefore, it is possible to bring the disk rotor 5 into tight contact with the outer end surface of the flange 10 to which the bolt 12 is attached in the non-separable manner, and it is possible to prevent the disk rotor 5 from being inclined unlike the prior art. Therefore, the rotation precision of the disk rotor 5 can be enhanced.

Figure 3:
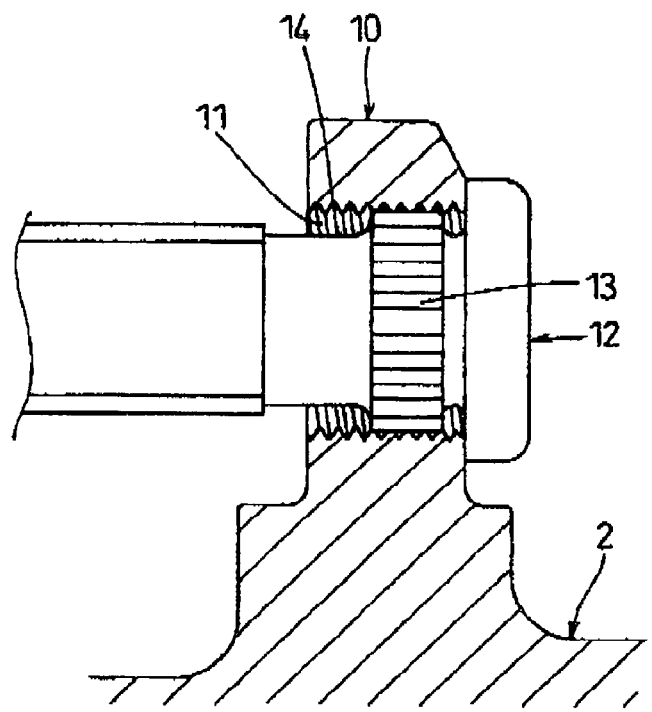
FIG. 3 is an enlarged view showing a main portion of a hub wheel in a bearing device for axle according to another embodiment of the present invention.
Figure 4:
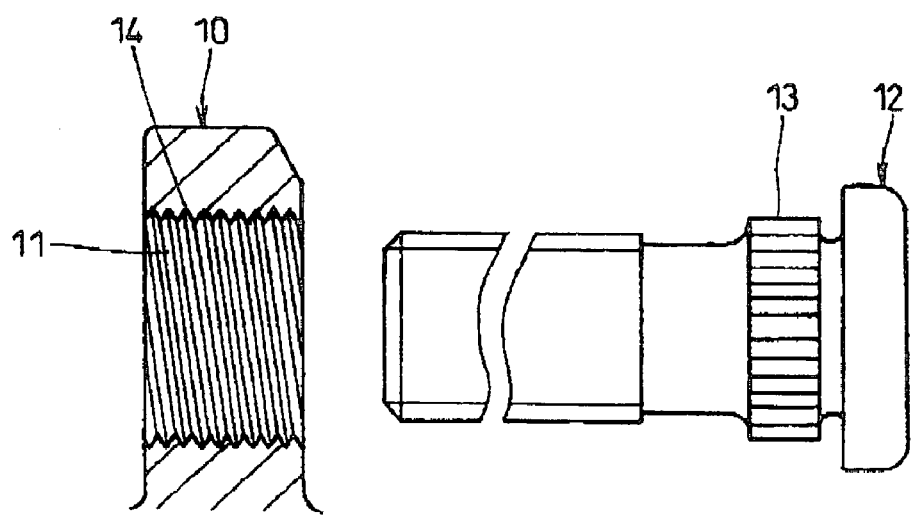
FIG. 4 shows a state before a bolt is attached in FIG. 3.
Figure 5:
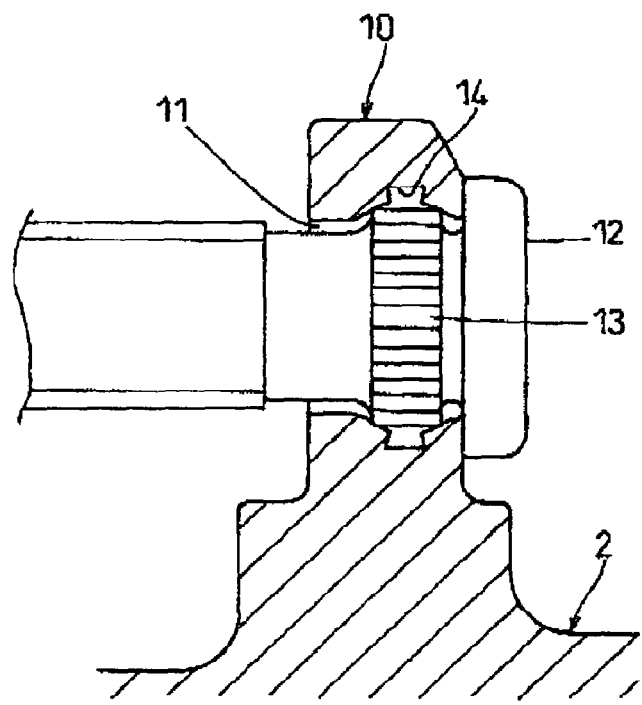
FIG. 5 is an enlarged view showing a main portion of a hub wheel in a bearing device for axle according to still another embodiment of the present invention.
Figure 6:
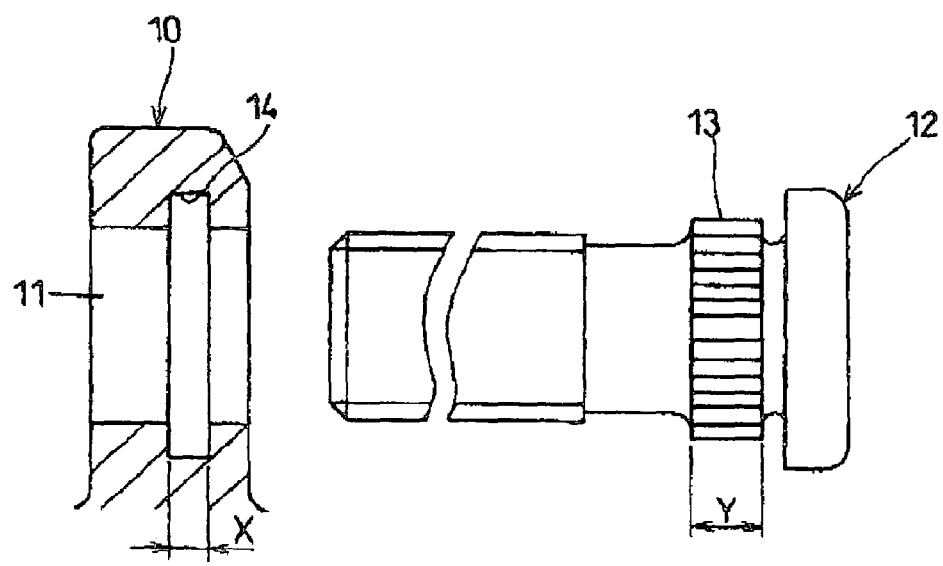
FIG. 6 shows a state before a bolt is attached in FIG. 5.

As shown in FIGS. 3 and 4, for example, the annular groove 14 may be formed helically and continuously in the inner peripheral surface of the through hole 11. Alternatively, an axial size of the annular groove 14 in a single form may be increased and its sectional shape may be of concave-shape as shown in FIGS. 5 and 6. It is preferable that the axial size X of the annular groove 14 and an axial size Y of a region of the serration 13 of the bolt 12 shown in FIGS. 5 and 6 is in a relation of X≦0.8Y. Any of these cases can obtain the operation and effect similar to that of the above-described embodiment. In the case of examples shown in FIGS. 5 and 6, the wall portion around the through hole 11 is slightly flowed when the serration 13 bites at the time of attaching operation of the bolt 12 to the through hole 11, but this flow of the wall portion is generated in a state where this flow deforms an inner wall of the annular groove 14 and does not affect the outer end surface of the flange 10. Therefore, this advantageously keeps the outer end surface of the flange 10 smooth.

Figure 7:
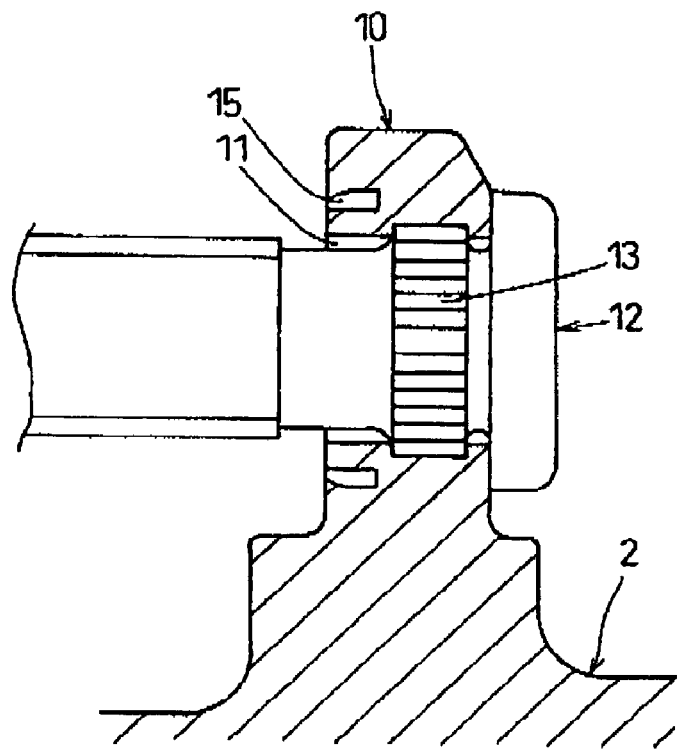
FIG. 7 is an enlarged view showing a main portion of a hub wheel in a bearing device for axle according to yet another embodiment of the present invention.
Figure 8:
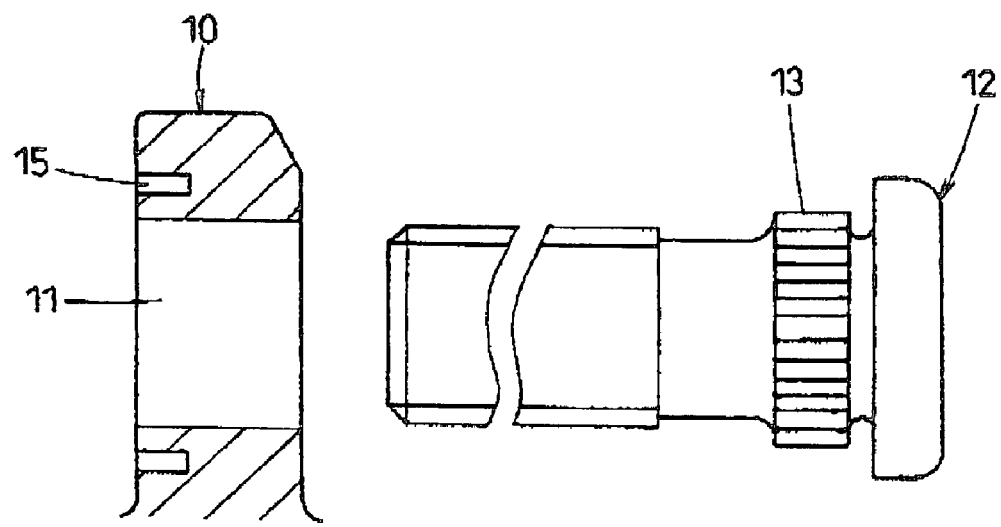
FIG. 8 shows a state before a bolt is attached in FIG. 7.
Figure 9:
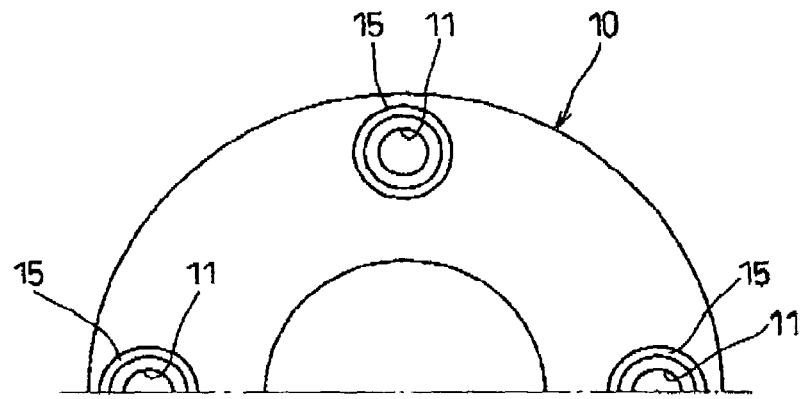
FIG. 9 is a plan view showing an inner end surface of a flange in FIG. 8.
Figure 10:
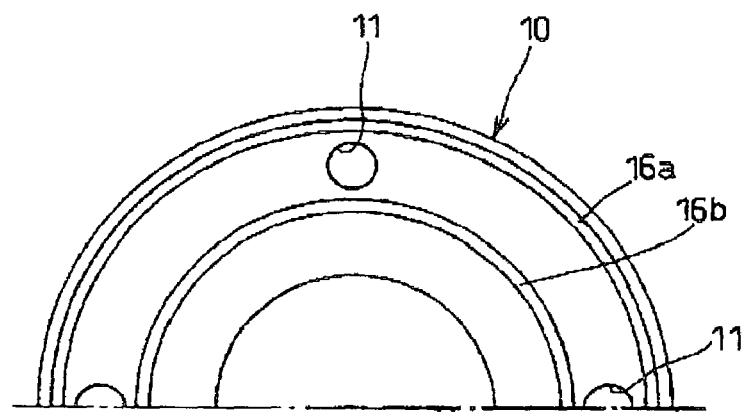
FIG. 10 shows a modification of the embodiment shown in FIG. 9.

In the above-described embodiment, the biting amount of the serration 13 of the bolt 12 with respect to the inner peripheral surface of the through hole 11 is reduced as small as possible. Alternatively, a weak portion for allowing a phenomenon in which the through hole 11 is increased in diameter by the plastic deformation when the bolt 12 is attached into the through hole 11 maybe provided around the through hole 11. More specifically, as shown in FIGS. 7 to 9, an annular recess 15 which is recessed from an outer side of a vehicle is concentrically formed in an outer peripheral portion of the through hole 11 in the flange 10. The annular recess 15 functions as the weak portion. As another example of the weak portion, as shown in FIG. 10, annular recesses 16a and 16b which are recessed from the outer side of the vehicle may be formed concentrically with the flange 10 in the outer diameter side and the inner diameter side of the through hole 11 in the flange 10. The sectional shape in this case is the same as those shown in FIGS. 7 and 8.

In any of these examples, as the serration 13 bites when the bolt 12 is attached into the through hole 11, the wall portion is flowed around the through hole 11 and the diameter of the through hole 11 is increased, but since the annular recesses 15, 16a and 16b suppress the flow of the wall portion from spreading to a wide area and absorb such flow, the undulating phenomenon of the outer end surface of the flange 10 can be suppressed, and its smoothness is maintained. In other words, the annular recesses 15, 16a and 16b function as flanges around the outer periphery of the through hole 11 and, thus, the flanges are bent as the wall portion is flowed around the through hole 11, and the flow is suppressed from spreading toward other portion and is absorbed. Even if the annular recesses 15, 16a and 16b are formed by being recessed from the inner side of the vehicle, such recesses are also included in the present invention.

Although various thought is put on the side of the flange 10 in the above-described embodiment, a hole 17 may be formed in the bolt 12 over its entire length as shown in FIG. 11, or a bottomed hole 18 may be formed from a head of the bolt 12 to a desired position exceeding the serration 13 as shown in FIG. 12. In this case, the bolt 12 becomes weak, as the serration 13 bites when the bolt 12 is attached into the through hole 11 of the flange 10, not only the wall portion around the through hole 11 is flowed, but also the bolt 12 itself is also reduced in diameter. If the deformation is shared to the outer periphery of the through hole 11 and the bolt 12 in this manner, it is possible to reduce the flow of the wall portion around the through hole 11 of the flange 10. Therefore, it is possible to prevent the flow of the wall portion from spreading toward the outer end surface of the flange 10, and the smoothness of the outer end surface of the flange 10 is maintained.

Although the hub wheel 2 functions as one inner ring of the double row angular ball bearing with vertex of contact angles outside of bearing 3 as shown in FIG. 16, the present invention can also be applied to a structure in which the one inner ring is independent from the hub wheel 2 although not shown in the figure.

Figure 18:
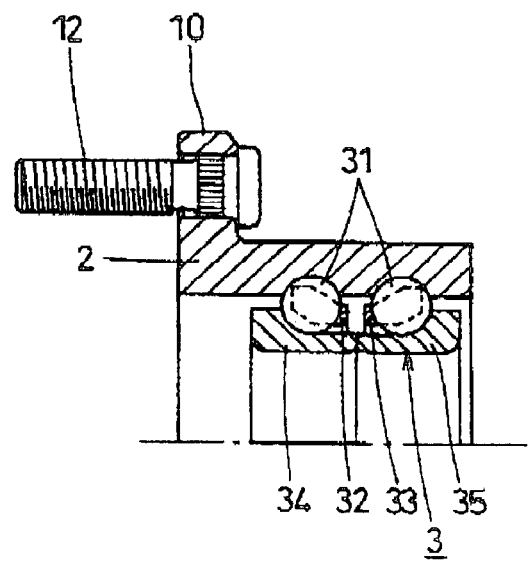
FIG. 18 is a vertical sectional view showing an upper half of a bearing device for axle for a follower wheel to which the present invention can be applied.

In the above-described embodiment, the bearing device 1 used for the driving wheel is shown in FIG. 16, the present invention can also be applied to a type in which the bearing device for axle 1 is used for a known follower wheel as shown in FIG. 18. In the bearing device for axle used for the follower wheel shown in FIG. 18, a double row rolling bearing such as the double row angular ball bearing with vertex of contact angles outside of bearing 3 is disposed in the inner periphery of the hub wheel 2. The hub wheel 2 herein is utilized as an outer ring of the double row angular ball bearing with vertex of contact angles outside of bearing 3, which comprises two rows of balls 31, two cages 32 and 33, and two inner rings 34 and 35. The features shown in each embodiment is applied to such a case also although not shown in detail.

FIGS. 13, 14 and 15 show another embodiments. FIG. 13 corresponds to FIG. 1, and shows that the bolt 12 is inserted into the through hole 11 of the flange 10. FIGS. 14 and 15 show that the bolt 12 is not inserted and show modifications of the through hole 11. In the embodiments shown in FIGS. 13 to 15, as in FIGS. 1 to 4, a helical annular groove 14 shown in FIGS. 14 and 15 are formed in the inner peripheral surface of the through hole 11, a first enlarged portion 21 and a second enlarged portion 22 which gradually spread are formed on axially opposite ends of the through hole 11. The first enlarged portion 21 is provided on an end of the through hole 11 on the side of a bolt seat surface 10a, and gradually spread toward the bolt seat surface 10a. The second enlarged portion 22 is provided on an end of the through hole 11 on the side of the outer end surface 10b and gradually spread toward the outer end surface 10b.

The inner peripheral surface 11a of the through hole 11 located between the first enlarged portion 21 and the second enlarged portion 22 is formed with an annular groove 14. The annular groove 14 is formed closer to the bolt seat surface 10a of the inner peripheral surface 1a in the axial direction. When the bolt 12 is inserted into the through hole 11, the serration 13 of the bolt 12 bites the annular groove 14 formed on the inner peripheral surface 11a closer to the bolt seat surface 10a and is fixed. The outer peripheral surface of the bolt 12 is not in contact with the first enlarged portion 21 and the second enlarged portion 22 in a state where the bolt 12 is attached into the through hole 11.

An axial region where the serration 13 bites the inner peripheral surface 11a is formed closer to the bolt seat surface 10a in the axial direction of the through hole 11. Therefore, the influence of biting of the serration 13 is less prone to be transferred to the outer end surface 10b, which is advantageous in that the outer end surface 10b of the flange 10 is maintained smooth. The flow of wall portion caused by the biting of the serration 13 with respect to the inner peripheral surface 11a moves to the annular groove 14, which suppresses the through hole 11 and its periphery from being deformed, which is advantageous in that the outer end surface 10b of the flange 10 is maintained smooth. The flow of wall portion caused by the biting of the serration 13 moves to the first enlarged portion 21 and the second enlarged portion 22 and is absorbed, which is more advantageous in that the outer end surface 10b of the flange 10 is maintained smooth.

When a width of the second enlarged portion 22 in its axial direction is formed greater than that of the first enlarged portion 21 in its axial direction, this is advantageous in that the outer end surface 10b of the flange 10 is maintained smooth. When a width of at least one of the first enlarged portion 21 and the second enlarged portion 22 in its axial direction exceeds 13% of a thickness of the flange 10, this is advantageous in that the outer end surface 10b of the flange 10 is maintained smooth. The first enlarged portion 21 functions as a guiding surface when the bolt 12 is inserted into the through hole 11, and the bolt 12 can be inserted smoothly.

As described above, according to the present invention, the flow amount of the wall portion around the through hole caused by the biting of the serration at the time when the bolt is attached into the through hole of the flange is reduced, the flow of the wall portion is less prone to be transferred to the outer end surface of the flange, and this is advantageous in that the outer end surface is maintained smooth.

Further, according to the present invention, the flow of the wall portion around the through hole caused by the biting of the serration at the time when the bolt is attached into the through hole of the flange is not transferred toward the outer end surface of the flange and is absorbed, and this is advantageous in that the outer end surface of the flange is maintained smooth.

According to the present invention, since the smoothness of the outer end surface of the flange can be ensured, the disk rotor can be attached to the outer end surface of the flange with an appropriate position without inclination, and rotation precision of the disk rotor can be enhanced.

What is claimed is:

1. A bearing device for an axle comprising:
   a hub wheel;
   a flange provided radially outwardly on an outer periphery of the hub wheel; and
   bolts having serrations provided at their heads,
   wherein the flange includes a plurality of through holes formed therein spaced in a circumferential direction of the flange such as to pass therethrough in an axial direction of the hub, the bolts being attached into the through holes, respectively, in a state where the serrations bite the through holes of the flange, and
   at least one annular groove reducing a biting amount of the serrations of the bolt being formed in inner peripheral surfaces of the through holes of the flange into which the bolts are attached prior to insertion of the bolts into the through holes,
   wherein the at least one annular groove includes at least two annular grooves that are independently provided in a biting region of the serration in the inner peripheral surface of the through hole in the axial direction.

2. The bearing device for an axle according to claim 1, wherein for each of the bolts a biting margin of the serration of the bolt with respect to the through hole is provided by setting a minimum inner diameter of the at least one annular groove of the through hole smaller than an outer diameter of the serration of the bolt.

3. The bearing device for an axle according to claim 2, wherein the biting margin is set to 0.5 mm or less.

4. The bearing device for an axle according to claim 1, wherein at least one of the annular grooves is provided in a biting region of the serration in an inner peripheral surface of the through hole.

5. The bearing device for an axle according to claim 1, wherein each of the at least one annular groove extends entirely around the circumference of the through hole and thus entirely around the bolt when present in the through hole.

6. The bearing device for an axle according to claim 1, wherein each of the at least one annular groove has a minimum diameter portion engaged with the bolt when present in the through hole and a recessed portion spaced radially outward from the minimum diameter portion and out of contact with the bolt when present in the through hole.

7. The bearing device for an axle according to claim 1, wherein the at least one annular groove comprises a plurality of annular grooves, a width of each of the annular grooves being smaller than an axial length of the serrations of the bolt such that the serrations of the bolt extend across a plurality of the annular grooves when the bolt is present in the through hole.

8. A bearing device for an axle, comprising:
a hub wheel;
a flange provided radially outwardly on an outer periphery of the hub wheel; and
bolts having serrations provided at their heads,
wherein the flange includes a plurality of through holes formed therein spaced in a circumferential direction of the flange such as to pass therethrough in an axial direction of the hub, the bolts being attached into the through holes, respectively, in a state where the serrations bite the through holes of the flange, and
at least one annular groove reducing a biting amount of the serrations of the bolt being formed in inner peripheral surfaces of the through holes of the flange into which the bolts are attached prior to insertion of the bolts into the through holes,
wherein the at least one annular groove is only one annular groove which is provided in a biting region of the serration in an inner peripheral surface of the through hole and has a cross section formed into a substantially concave-shape which satisfies a relation of X≦0.8Y in which an axial size of the annular groove is X and an axial size of the serration of the bolt is Y.

9. The bearing device for an axle according to claim 8, wherein for each of the bolts the serration of the bolt is attached to the through hole in a state where the serration of the bolt bites a biting portion of the inner peripheral surface of the through hole disposed closer to an inner end surface of the flange than an outer end surface of the flange, and the annular groove is formed in the biting portion.

10. The bearing device for an axle according to claim 9, wherein an axial width of a first enlarged portion formed on a side of the outer end surface of the flange is formed greater than an axial width of a second enlarged portion formed on the inner end surface of the flange at a side of a seat surface of the bolt.

11. The bearing device for an axle according to claim 8, wherein the at least one annular groove is concaved and has a concavity width in the axial direction greater than a concavity depth.

12. A bearing device for an axle comprising:
a hub wheel;
a flange provided radially outwardly on an outer periphery of the hub wheel, the flange having formed therein a plurality of through holes spaced in a circumferential direction such as to pass therethrough in an axial direction of the hub, the flange being provided at an outer end surface with a disk rotor of a disk brake apparatus; and
a plurality of wheel-mounting bolts having serrations provided at heads thereof, the bolts being attached into the through holes respectively in a state where the serrations bite the through holes of the flange, wherein
a weak portion for allowing a phenomenon in which a diameter of the through hole is increased by plastic deformation at the time when the bolt is attached into the through hole is provided around the through hole.

13. The bearing device for an axle according to claim 12, wherein the weak portion has an annular recess which is formed by recessing an outer peripheral portion of the through hole in the flange from an outer side or an inner side of a vehicle concentrically with the through hole.

14. The bearing device for an axle according to claim 12, wherein the weak portion has annular recesses which are formed by recessing an outer diameter side and an inner diameter side of the through hole in the flange from an outer side or an inner side of a vehicle concentrically with the flange.

15. The bearing device for an axle according to claim 12, wherein the bolts each have an axial hole extending from the heads of the bolts to a position beyond the serrations.

16. A bearing device for an axle, comprising:
a hub wheel;
a flange provided radially outwardly on an outer periphery of the hub wheel; and
bolts having serrations provided at their heads,
wherein the flange includes a plurality of through holes formed therein spaced in a circumferential direction of the flange such as to pass therethrough in an axial direction of the hub, the bolts being attached into the through holes, respectively, in a state where the serrations bite the through holes of the flange, and
at least one annular groove reducing a biting amount of the serrations of the bolt being formed in inner peripheral surfaces of the through holes of the flange into which the bolts are attached prior to insertion of the bolts into the through holes,
wherein for each of the through holes enlarged portions are formed in the inner peripheral surface of the through hole on axially opposite ends of the through hole and the enlarged portion increase a diameter of the through hole with decreasing distance to and up to the axially opposite ends of the through hole.

17. A bearing device for an axle comprising:
a hub wheel;
a flange provided radially outwardly in an outer periphery of the hub wheel; and
bolts having serrations provided at their heads,
wherein the flange includes a plurality of through holes formed therein spaced in a circumferential direction of the flange such as to pass therethrough in an axial direction of the hub, the bolts being attached into the through holes, respectively, in a state where the serrations bite the through holes of the flange,
a single annular groove reducing a biting amount of the serrations of the bolt being formed in an inner peripheral surface of the through hole of the flange, the annular groove being provided in a biting region of the serration in an inner peripheral surface of the through hole, and a cross section of the annular groove being formed into a substantially concave-shape which satisfies a relation of X≲0.8Y in which an axial size of the annular groove is X and an axial size of the serration of the bolt is Y.

18. A bearing device for an axle comprising:

a hub wheel;

a flange provided radially outwardly in an outer periphery of the hub wheel; and bolts having serrations provided at their heads, wherein the flange includes a plurality of through holes formed therein spaced in a circumferential direction of the flange such as to pass therethrough in an axial direction of the hub, the bolts being attached into the through holes, respectively, in a state where the serrations bite the through holes of the flange, a plurality of annular grooves reducing a biting amount of the serrations of the bolt being formed in an inner peripheral surface of the through hole of the flange, and at least two of the annular grooves being independently provided in a biting region of the serration in the inner peripheral surface of the through hole in the axial direction.

19. A bearing device for an axle comprising:

a hub wheel;

a flange provided radially outwardly in an outer periphery of the hub wheel; and bolts having serrations provided at their heads, wherein the flange includes a plurality of through holes formed therein spaced in a circumferential direction of the flange such as to pass therethrough in an axial direction of the hub, the bolts being attached into the through holes, respectively, in a state where the serrations bite the through holes of the flange, a plurality of annular grooves reducing a biting amount of the serrations of the bolt being formed in an inner peripheral surface of the through hole of the flange, and enlarged portions which are gradually enlarged are formed on axially opposite ends of the through hole.

20. The bearing device for an axle according to claim 19, wherein for each of the through holes one of the enlarged portions formed at the outer end surface of the flange has an axial depth greater than 13% of an axial thickness of the flange.

* * * * *